(12) United States Patent
Endo et al.

(10) Patent No.: US 8,776,148 B2
(45) Date of Patent: Jul. 8, 2014

(54) INHERITED COMMUNICATION MANAGEMENT APPARATUS AND METHOD OF MANAGING INHERITED COMMUNICATION

(75) Inventors: Tomotaka Endo, Kawasaki (JP); Yu Minakuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 13/371,558

(22) Filed: Feb. 13, 2012

(65) Prior Publication Data
US 2012/0227080 A1 Sep. 6, 2012

(30) Foreign Application Priority Data

Mar. 1, 2011 (JP) .................................. 2011-043805

(51) Int. Cl.
| | |
|---|---|
| H04N 7/173 | (2011.01) |
| H04N 21/433 | (2011.01) |
| H04N 21/414 | (2011.01) |
| H04N 21/61 | (2011.01) |
| H04N 21/472 | (2011.01) |
| H04N 21/442 | (2011.01) |
| G06K 9/00 | (2006.01) |
| H04N 1/00 | (2006.01) |

(52) U.S. Cl.
CPC .. *H04N 21/4333* (2013.01); *G06K 2009/00738* (2013.01); *H04N 21/41407* (2013.01); *H04N 21/6125* (2013.01); *H04N 21/47217* (2013.01); *H04N 1/00307* (2013.01); *H04N 21/44204* (2013.01); *H04N 21/6131* (2013.01)
USPC .......... 725/86; 725/62; 725/115; 235/472.01; 235/472.02

(58) Field of Classification Search
CPC .................... H04N 21/47202; H04N 21/4126; H04N 21/41407; H04N 1/00307; G06K 2009/00711
USPC ............. 725/115, 62, 86; 235/472.01, 472.02
See application file for complete search history.

(56) References Cited

U.S. PATENT DOCUMENTS 7,689,236 B2 * 3/2010 Matero et al. ................. 455/506
7,725,399 B2 5/2010 Nakahara et al.
(Continued)

FOREIGN PATENT DOCUMENTS

JP 2002-328949 A 11/2002
JP 2003-323343 A 11/2003
(Continued)

OTHER PUBLICATIONS

Korean Notice of Preliminary Rejection mailed Apr. 16, 2013 for corresponding Korean Patent Application No. 10-2012-0018660, with Partial English-language Translation.

*Primary Examiner* — Nasser Goodarzi
*Assistant Examiner* — Michael B Pierorazio
(74) *Attorney, Agent, or Firm* — Fujitsu Patent Center

(57) ABSTRACT

In an inherited communication management apparatus, a storage unit stores viewing information relating to the content viewing state of a user of a terminal. On a request from the user of the terminal for content viewing, a requesting unit requests another inherited communication management apparatus to examine whether or not the other inherited communication management apparatus stores viewing information including information relating to interruption of the content viewing by the user. A receiving unit receives a result of the examination requested by the requesting unit. When the examination result received by the receiving unit includes the viewing information including information relating to the interruption of the content viewing, a transmitting unit transmits information relating to interrupted content based on the viewing information to the terminal of the user that has requested the content viewing.

7 Claims, 13 Drawing Sheets

(56) References Cited

U.S. PATENT DOCUMENTS

| | | |
|---|---|---|
| 7,873,974 B2 * | 1/2011 | DaCosta .................. 725/62 |
| 2002/0165987 A1 | 11/2002 | Arisaka et al. |
| 2007/0124775 A1 * | 5/2007 | DaCosta .................. 725/62 |
| 2007/0157281 A1 * | 7/2007 | Ellis et al. .............. 725/134 |
| 2008/0022330 A1 * | 1/2008 | Barrett .................... 725/89 |
| 2008/0134256 A1 * | 6/2008 | DaCosta .................. 725/62 |
| 2008/0155615 A1 * | 6/2008 | Craner et al. ............ 725/91 |
| 2008/0201754 A1 * | 8/2008 | Arling et al. ........... 725/114 |
| 2008/0235733 A1 * | 9/2008 | Heie et al. ............... 725/46 |
| 2010/0031295 A1 * | 2/2010 | Krzyzanowski et al. .... 725/52 |
| 2010/0125876 A1 * | 5/2010 | Craner et al. ............ 725/61 |
| 2010/0332590 A1 * | 12/2010 | Minakuchi et al. ....... 709/203 |
| 2011/0314491 A1 * | 12/2011 | Delidais et al. .......... 725/23 |

FOREIGN PATENT DOCUMENTS

| | | |
|---|---|---|
| JP | 2004-362189 A | 12/2004 |
| JP | 2007-006235 A | 1/2007 |
| JP | 2009-055099 A | 3/2009 |
| JP | 2010-170856 A | 8/2010 |
| JP | 2011-010119 A | 1/2011 |
| KR | 2009-0091822 | 8/2009 |
| WO | WO-2008/121136 A2 | 10/2008 |

\* cited by examiner

FIG. 5

| SERVICE MANAGEMENT INFORMATION ID | SERVICE ID | USER ID | STATE | VIEWING INFORMATION | TERMINAL INFORMATION | BAND INFORMATION |

| USER ID | SERVER |
|---------|--------|
| xxxx | 1xx.2xx.3xx.4xx |
|  | ⋮ |
|  | 2xx.3xx.4xx.5xx |
| ⋮ | ⋮ |
| yyyy | 3xx.4xx.5xx.6xx |
|  | ⋮ |
|  | 4xx.5xx.6xx.7xx |

US 8,776,148 B2

INHERITED COMMUNICATION MANAGEMENT APPARATUS AND METHOD OF MANAGING INHERITED COMMUNICATION

CROSS-REFERENCE TO RELATED APPLICATION

This application is based upon and claims the benefit of priority of the prior Japanese Patent Application No. 2011-043805, filed on Mar. 1, 2011, the entire contents of which are incorporated herein by reference.

FIELD

The embodiments discussed herein are related to inherited communication management apparatuses connected to content distribution systems including distribution servers that distribute content and terminals that receive and reproduce the content. The embodiments are also related to methods of managing inherited communication.

BACKGROUND

Existing distribution business operators, which distribute video content requested from viewing terminals, provide video distribution services for, for example, cellular phones and Internet televisions via Internet Protocol (IP) networks (for example, see Japanese Laid-open Patent Publication Nos. 2007-6235 and 2009-55099).

In addition, inherited communication management apparatuses have been proposed, which simplify user operations performed when video content is viewed using different viewing terminals in succession (for example, see Japanese Laid-open Patent Publication No. 2011-10119).

Under the circumstances described above, a user may stop viewing content that the user was viewing using a terminal connectable to a network of a first telecommunications carrier, and may attempt to resume viewing the content using another terminal connectable to a second telecommunications carrier. In this case, the user may not be able to resume viewing the interrupted content since information relating to the interruption of the content viewing is managed in the network of the first telecommunications carrier.

SUMMARY

According to an aspect of the present invention, an inherited communication management apparatus, connected to a content distribution system including a distribution server that distributes content and terminals that receive and reproduce the content, includes a storage unit that stores viewing information relating to a content viewing state of a terminal; a requesting unit that requests another inherited communication management apparatus to examine whether or not the other inherited communication management apparatus stores viewing information including information relating to interruption of content viewing on a request from the terminal for the content viewing; a receiving unit that receives a result of the requested examination; and a transmitting unit that transmits information relating to interrupted content based on the viewing information to the terminal that has requested the content viewing when the received examination result includes the viewing information including information relating to the interruption of the content viewing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example data structure of service management information;

FIG. 6 illustrates example address information in the second inherited communication management server that belongs to a network of a second telecommunications carrier;

DESCRIPTION OF EMBODIMENTS

Embodiments of the present invention will now be described with reference to the drawings.

[a] First Embodiment

Figure 1:
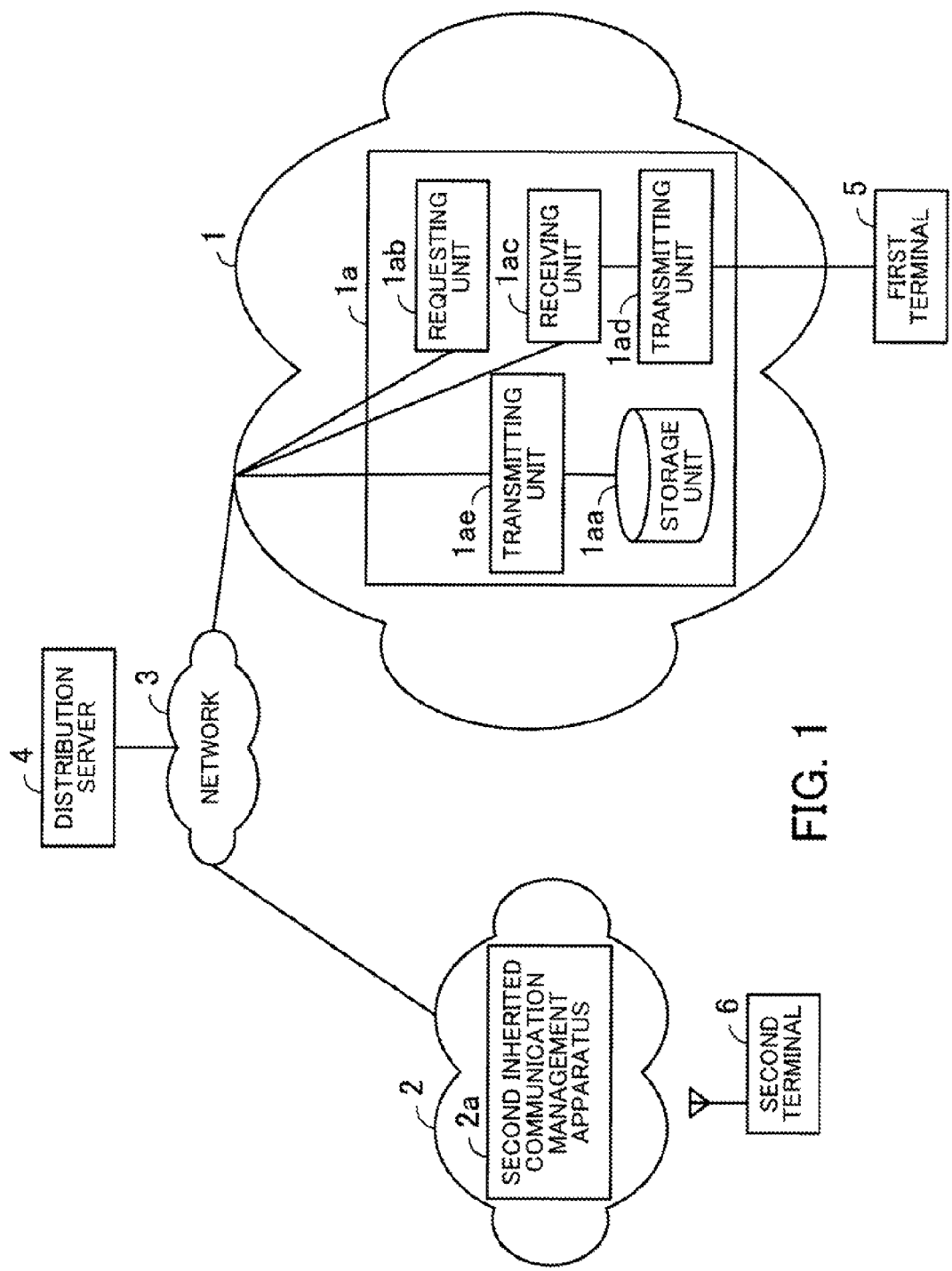
FIG. 1 illustrates inherited communication management apparatuses according to a first embodiment.

FIG. 1 illustrates inherited communication management apparatuses according to a first embodiment. As illustrated in FIG. 1, a first inherited communication management apparatus 1a includes a storage unit 1aa, a requesting unit 1ab, a receiving unit 1ac, and transmitting units 1ad and 1ae. Similarly, a second inherited communication management apparatus 2a includes a storage unit, a requesting unit, a receiving unit, and transmitting units as does the first inherited communication management apparatus 1a. FIG. 1 also illustrates networks 1 to 3, a distribution server 4, a first terminal 5, and a second terminal 6.

The networks 1 and 2 are owned by different telecommunications carriers. For example, the network 1 is owned by an Internet provider serving as a first telecommunications carrier, and the network 2 is owned by a mobile communications carrier serving as a second telecommunications carrier. The network 3 is, for example, the Internet.

The first inherited communication management apparatus 1a belongs to the network 1, and is managed by the first telecommunications carrier that owns the network 1. The second inherited communication management apparatus 2a belongs to the network 2, and is managed by the second telecommunications carrier that owns the network 2. The inherited communication management apparatuses 1a and 2a are connected to a content distribution system including the distribution server 4 that distributes content via the network 3 and the terminals 5 and 6 that receive and reproduce the distributed content.

The first terminal 5 is, for example, an Internet television connected to the network 1 of the Internet provider, and may receive content from the distribution server 4. The second terminal 6 is, for example, a mobile terminal such as a cellular phone connected to the network 2 of the mobile communications carrier, and may receive content from the distribution server 4.

The storage unit 1aa of the first inherited communication management apparatus 1a stores viewing information relating to the content viewing state of a user using the first terminal 5. The viewing information includes, for example, information relating to the location and playback time of video content that the user is viewing using the first terminal 5. The playback time is, for example, successively reported from the first terminal 5, and is updated. The viewing information further includes playback time at which the user stopped viewing the video content that the user was viewing using the first terminal 5. Similarly, the storage unit of the second inherited communication management apparatus 2a stores viewing information relating to content viewing by the user using the second terminal 6.

On a request for content viewing from the user using the first terminal 5, the requesting unit 1ab requests the second inherited communication management apparatus 2a that belongs to the network 2 of the second telecommunications carrier to examine whether or not the second inherited communication management apparatus 2a stores viewing information including information relating to interruption of the content viewing by the user. For example, the requesting unit 1ab requests the second inherited communication management apparatus 2a that belongs to the network 2 of the second telecommunications carrier to examine whether or not the second inherited communication management apparatus 2a stores viewing information including the playback time at which the user stopped viewing the content.

The receiving unit 1ac receives a result of the examination requested by the requesting unit 1ab.

When the examination result received by the receiving unit 1ac includes the viewing information including information relating to the interruption of the content viewing, the transmitting unit 1ad transmits information relating to the content that the user stopped viewing based on the received viewing information to the first terminal 5 of the user that has requested the content viewing. For example, the transmitting unit 1ad transmits information relating to the location of the content that the user stopped viewing and the playback time at which the user stopped viewing the content to the first terminal 5 on the basis of the viewing information received by the receiving unit 1ac.

The transmitting unit 1ae transmits an examination result to the second inherited communication management apparatus 2a that belongs to the network 2 of the second telecommunications carrier in response to a request for examination from the second inherited communication management apparatus 2a. When the storage unit 1aa stores viewing information including information relating to interruption of content viewing by the user, the transmitting unit 1ae transmits the viewing information to the second inherited communication management apparatus 2a.

Operations in FIG. 1 will now be described. Herein, a user A views video content using the second terminal 6. Subsequently, the user A stops viewing the video content. In this case, viewing information including the playback time at the interruption is stored in the storage unit of the second inherited communication management apparatus 2a.

Subsequently, the user A requests content viewing from the first inherited communication management apparatus 1a using the first terminal 5. When first inherited communication management apparatus 1a receives the request for the content viewing from the first terminal 5, the requesting unit 1ab requests the second inherited communication management apparatus 2a that belongs to the network 2 of the second telecommunications carrier to examine whether or not the second inherited communication management apparatus 2a stores viewing information including information relating to interruption of the content viewing by the user A.

The receiving unit 1ac receives the examination result from the second inherited communication management apparatus 2a. When the examination result received by the receiving unit 1ac includes viewing information including information relating to the interruption of the content viewing, the transmitting unit 1ad transmits information relating to the content that the user stopped viewing to the first terminal 5 of the user that has requested the content viewing on the basis of the received viewing information.

In the case above, the storage unit of the second inherited communication management apparatus 2a stores viewing information including information relating to the interruption of the content viewing by the user A. Therefore, the transmitting unit 1ad transmits, for example, information relating to the location of the content that the user stopped viewing and the playback time at which the user stopped viewing the content to the first terminal 5 on the basis of the viewing information received by the receiving unit 1ac. This allows the first terminal 5 to access the video content that the user A stopped viewing using the second terminal 6 and to reproduce the content from the time at which the user A stopped viewing the content.

As described above, on a request for content viewing from a user of the first terminal 5, the requesting unit 1ab of the first inherited communication management apparatus 1a requests the second inherited communication management apparatus 2a that belongs to the network 2 of the second telecommunications carrier to examine whether or not the second inherited communication management apparatus 2a stores viewing information including information relating to interruption of the content viewing by the user. When the examination result received by the receiving unit 1ac includes the viewing information including information relating to the interruption of the content viewing, the transmitting unit 1ae transmits the information relating to the content that the user stopped viewing to the first terminal 5 that has requested the content viewing. This allows the user A to resume viewing the interrupted content using one of the terminals 5 and 6 connected to the different networks 1 and 2, respectively, even when the user stopped viewing the content using the other terminal.

[b] Second Embodiment

Next, a second embodiment will be described with reference to the drawings.

Figure 2:
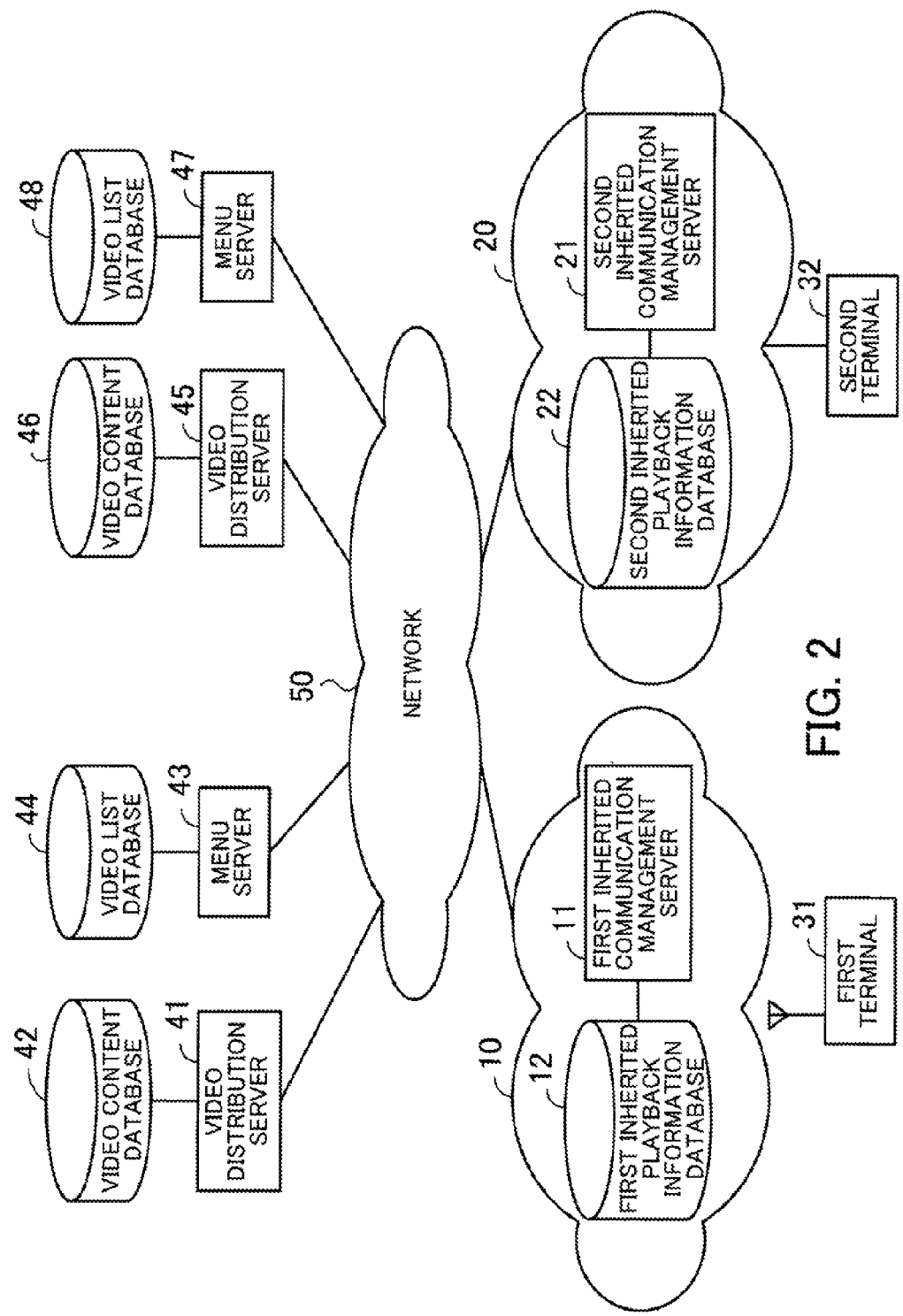
FIG. 2 illustrates an example network system to which first and second inherited communication management servers according to a second embodiment are applied.

FIG. 2 illustrates an example network system to which inherited communication management servers according to the second embodiment are applied. As illustrated in FIG. 2, the network system includes networks 10, 20, and 50. The network 10 is, for example, owned by a mobile communications carrier serving as a first telecommunications carrier. The network 20 is, for example, owned by an Internet provider serving as a second telecommunications carrier. The network 50 is, for example, the Internet.

The network 10 includes a first inherited communication management server 11 and a first inherited playback information database 12. The first inherited communication management server 11 and the first inherited playback information database 12 are managed by, for example, the mobile communications carrier that owns the network 10.

The network 20 includes a second inherited communication management server 21 and a second inherited playback information database 22. The second inherited communication management server 21 and the second inherited playback information database 22 are, for example, managed by the Internet provider that owns the network 20.

A first terminal 31 is, for example, a mobile terminal such as a cellular phone. The first terminal 31 may be connected to the network 10 of the mobile communications carrier. In addition, the first terminal 31 may be connected to the network 50 via the network 10.

A second terminal 32 is, for example, an Internet television. The second terminal 32 may be connected to the network 20 of the Internet provider. In addition, the second terminal 32 may be connected to the network 50 via the network 20.

The network 50 are connected to video distribution servers 41 and 45, menu servers 43 and 47, video content databases 42 and 46, and video list databases 44 and 48.

The video distribution server 41 has a function as a streaming server that distributes video content, and distributes video content to the first terminal 31. The video distribution server 41 distributes the video content in response to requests for distribution from the first terminal 31 via the network 10. The video content database 42 stores the video content to be distributed to the first terminal 31.

The menu server 43 has, for example, a Web function, and provides video list data regarding available video content for the first terminal 31 serving as a mobile terminal. The video list database 44 stores the video list data regarding the video content available to the first terminal 31.

The video distribution server 45 has a function as a streaming server that distributes video content, and distributes video content to the second terminal 32. The video distribution server 45 distributes the video content in response to requests for distribution from the second terminal 32 via the network 20. The video content database 46 stores the video content to be distributed to the second terminal 32.

The menu server 47 has, for example, a Web function, and provides video list data regarding available video content for the second terminal 32 serving as an Internet television. The video list database 48 stores the video list data regarding the video content available to the second terminal 32.

The video distribution server 41 and the menu server 43 may be included in a server. Similarly, the video distribution server 45 and the menu server 47 may be included in a server.

The video distribution server 41 and the menu server 43 may be managed by, for example, the mobile communications carrier that owns the network 10 or by another telecommunications carrier. Similarly, the video distribution server 45 and the menu server 47 may be managed by, for example, the Internet provider that owns the network 20 or by another telecommunications carrier.

Figure 3:
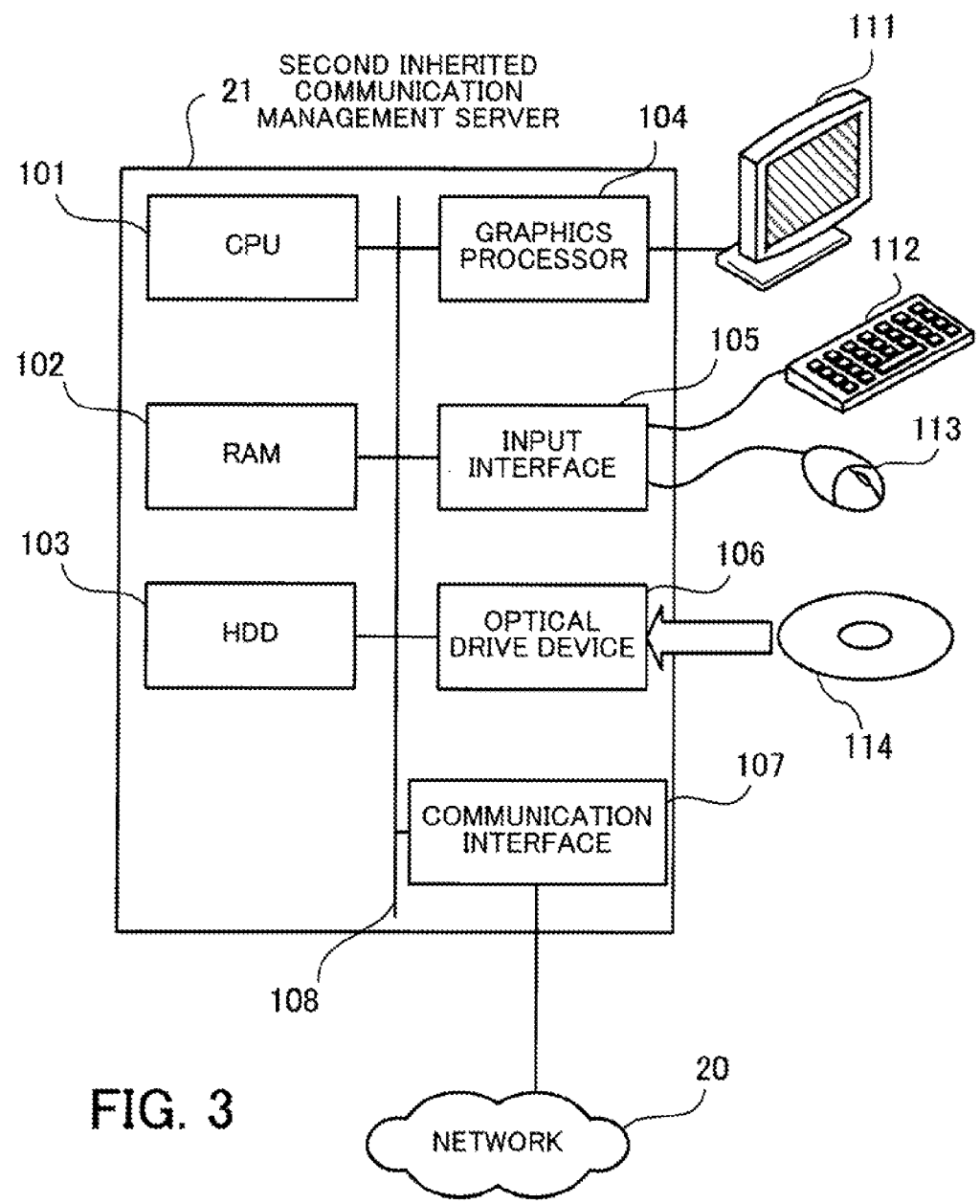
FIG. 3 illustrates an example hardware configuration of the second inherited communication management server.

FIG. 3 illustrates an example hardware configuration of the second inherited communication management server. The second inherited communication management server 21 is controlled by a central processing unit (CPU) 101. The CPU 101 is connected to a random access memory (RAM) 102 and a plurality of peripherals via a bus 108.

The RAM 102 is used as a main storage of the second inherited communication management server 21. The RAM 102 temporarily stores at least part of operating system (OS) programs and application programs executed by the CPU 101. The RAM 102 also stores various data required for the CPU 101 to perform processing tasks.

The peripherals connected to the bus 108 include a hard disk drive (HDD) 103, a graphics processor 104, an input interface 105, an optical drive device 106, and a communication interface 107.

The HDD 103 magnetically reads/writes data from/to a built-in disk. The HDD 103 is used as a secondary storage of the second inherited communication management server 21. The HDD 103 stores OS programs, application programs, and various data. A semiconductor storage device such as a flash memory may also be used as the secondary storage.

The graphics processor 104 is connected to a monitor 111. The graphics processor 104 displays pictures on a screen of the monitor 111 in accordance with commands from the CPU 101. The monitor 111 includes a display device including a cathode ray tube (CRT) and a liquid crystal display.

The input interface 105 is connected to a keyboard 112 and a mouse 113. The input interface 105 transmits signals sent from the keyboard 112 and the mouse 113 to the CPU 101. Herein, the mouse 113 is an example of a pointing device, and other pointing devices may be used. The other pointing devices include a touch panel, a tablet, a touch pad, and a track ball.

The optical drive device 106 reads data stored in an optical disk 114 using, for example, laser light. The optical disk 114 is a portable recording medium in which data is recorded so as to be readable using light reflection. The optical disk 114 includes, for example, a digital versatile disc (DVD), a DVD-RAM, a compact disc read-only memory (CD-ROM), a CD-recordable (CD-R), and a CD-rewritable (CD-RW).

The communication interface 107 is connected to the network 20. The communication interface 107 transmits/receives data to/from other computers or communication devices via the network 20.

The second inherited communication management server may implement a function of processing inherited communication with the example hardware configuration described above. The first inherited communication management server 11 also has a hardware configuration similar to that of the second inherited communication management server 21 illustrated in FIG. 3.

Figure 4:
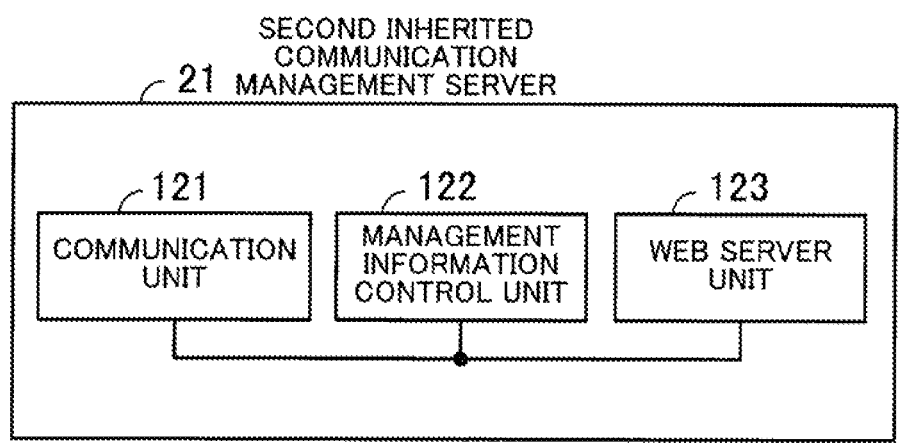
FIG. 4 illustrates example functional blocks of the second inherited communication management server.

FIG. 4 illustrates example functional blocks of the second inherited communication management server. As illustrated in FIG. 4, the second inherited communication management server 21 includes a communication unit 121 that performs communication via the network 20. The second inherited communication management server 21 further includes a management information control unit 122 that manages viewing information for each user and that requests inherited communication management servers that belong to networks of other telecommunications carriers to examine whether or not the inherited communication management servers store viewing information. In addition, the second inherited communication management server 21 includes a Web server unit 123 that, for example, provides Web pages to the second terminal 32 serving as a requestor. The first inherited communication management server 11 also has functional blocks similar to those illustrated in FIG. 4, and the descriptions thereof are omitted.

FIG. 5 illustrates an example data structure of service management information. As illustrated in FIG. 5, service management information 126 includes fields of a service management information identification (ID), a service ID, a user ID, a state, viewing information, terminal information, and band information. The service management information 126 is generated by the management information control unit 122 when, for example, a user requests a list of video content from the second inherited communication management server 21 (when the user starts viewing video content). The service management information 126 is formed in, for example, the RAM 102 or the HDD 103 illustrated in FIG. 3.

The field of the service management information ID contains an identifier used to identify the service management information 126.

The field of the service ID contains the type of the content that the user attempts to view. When the user attempts to view video content, for example, information indicating video content is stored in the field of the service ID. When the user attempts to listen to music content, information indicating music content is stored in the field of the service ID. The field of the user ID contains an identifier assigned to the user that views the content.

The field of the state contains viewing state of the user. When the user is viewing video content, for example, a state "playback" is stored in the field of the state. When the user stopped viewing the video content, a state "interrupted" is stored in the field of the state.

The field of the viewing information contains, for example, information relating to the location of the content that the user is viewing or playback time of the content that is being played using the second terminal 32. The information relating to the location of the content is, for example, a uniform resource locator (URL) of the video content that the user is viewing.

The field of the viewing information further contains, for example, information relating to interruption of content viewing by the user. Information relating to the interruption of the content viewing is, for example, information relating to an interrupted position of the video content when the user stopped viewing the video content. The information relating to the interrupted position when the user stopped playing the content is indicated by, for example, relative time from the head of the content.

The field of the viewing information also contains, for example, the volume and the voice channel (language) on which the user is viewing the content and subtitle display information indicating whether or not the user displays subtitles. When the user stops viewing the content, the volume, the voice channel, and the subtitle display information at the interruption are stored in the field of the viewing information.

The field of the terminal information contains information relating to the terminal that the user uses when the user views the content. When the user views the content using a cellular phone, for example, information indicating a cellular phone is stored in the field of the terminal information. When the user views the content using an Internet television, information indicating an Internet television is stored in the field of the terminal information.

The field of the band information contains a network band in which content is distributed from the video distribution servers 41 and 45 to the terminals 31 and 32.

FIG. 6 illustrates example address information in the second inherited communication management server that belongs to the network of the second telecommunications carrier. As illustrated in FIG. 6, address information 127 includes fields of user IDs and servers. The address information 127 is formed in, for example, the RAM 102 or the HDD 103 illustrated in FIG. 3.

Each user ID field contains a user ID of a user. Each server field contains an IP address of an inherited communication management server that is managed by a telecommunications carrier (a telecommunications carrier other than that of the second inherited communication management server 21) and that the corresponding users may access (may request content viewing).

For example, according to the address information 127 illustrated in FIG. 6, a user having a user ID "xxxx" may access inherited communication management servers having IP addresses "1xx.2xx.3xx.4xx", . . . , and "2xx.3xx.4xx.5xx" in addition to the second inherited communication management server 21.

Figure 7:
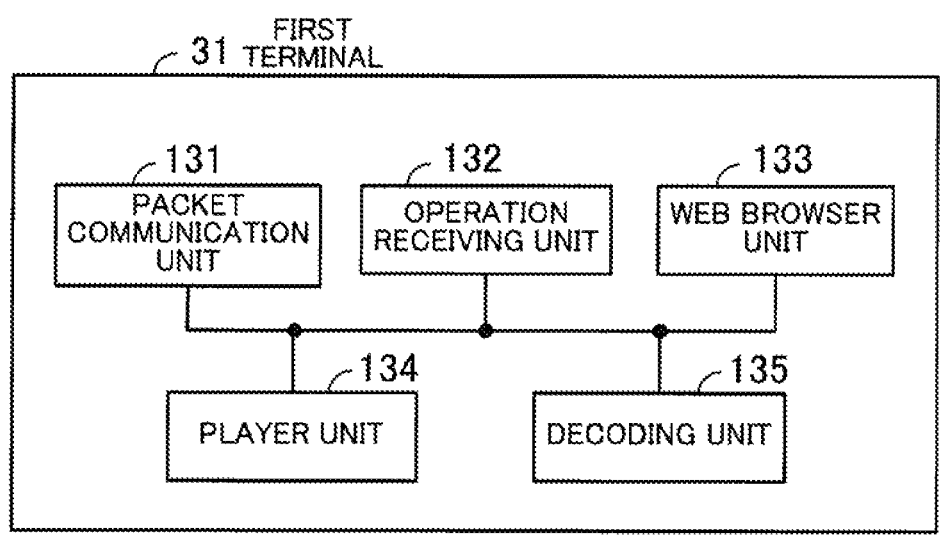
FIG. 7 illustrates example functional blocks of a first terminal.

FIG. 7 illustrates example functional blocks of the first terminal. As illustrated in FIG. 7, the first terminal 31 includes a packet communication unit 131 that performs wireless packet communication, an operation receiving unit 132 that receives user operations, and a Web browser unit 133 that reads Web pages from Web servers. The first terminal 31 further includes a player unit 134 that reproduces distributed content and a decoding unit 135 that expands compressed data when the content is reproduced.

Figure 8:
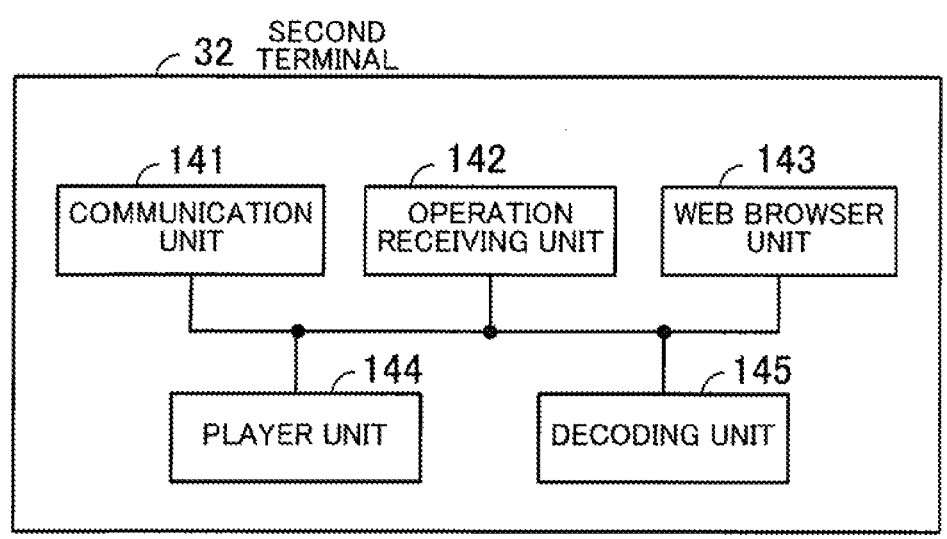
FIG. 8 illustrates example functional blocks of a second terminal.

FIG. 8 illustrates example functional blocks of the second terminal. As illustrated in FIG. 8, the second terminal 32 includes a communication unit 141 that performs packet communication via networks, an operation receiving unit 142 that receives user operations, and a Web browser unit 143 that reads Web pages from Web servers. The second terminal 32 further includes a player unit 144 that reproduces distributed content and a decoding unit 145 that expands compressed data when the content is reproduced.

Figure 9:
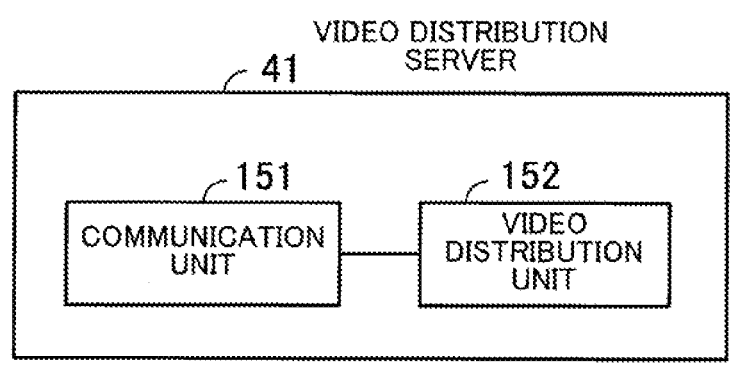
FIG. 9 illustrates example functional blocks of a video distribution server.

FIG. 9 illustrates example functional blocks of the video distribution server 41. As illustrated in FIG. 9, the video distribution server 41 includes a communication unit 151 that communicates via the networks and a video distribution unit 152 that distributes video content in a streaming fashion to the terminals 31 and 32 serving as requestors. The video distribution server 45 also includes functional blocks similar to those illustrated in FIG. 9, and the descriptions thereof are omitted.

Figure 10:
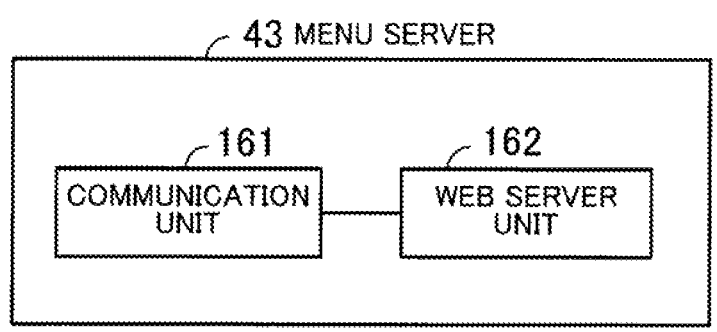
FIG. 10 illustrates example functional blocks of a menu server.

FIG. 10 illustrates example functional blocks of the menu server 43. As illustrated in FIG. 10, the menu server 43 includes a communication unit 161 that communicates via the networks and a Web server unit 162 that, for example, provides Web pages to the terminals 31 and 32 serving as the requestors. The menu server 47 also includes functional blocks similar to those illustrated in FIG. 10, and the descriptions thereof are omitted.

Figure 11:
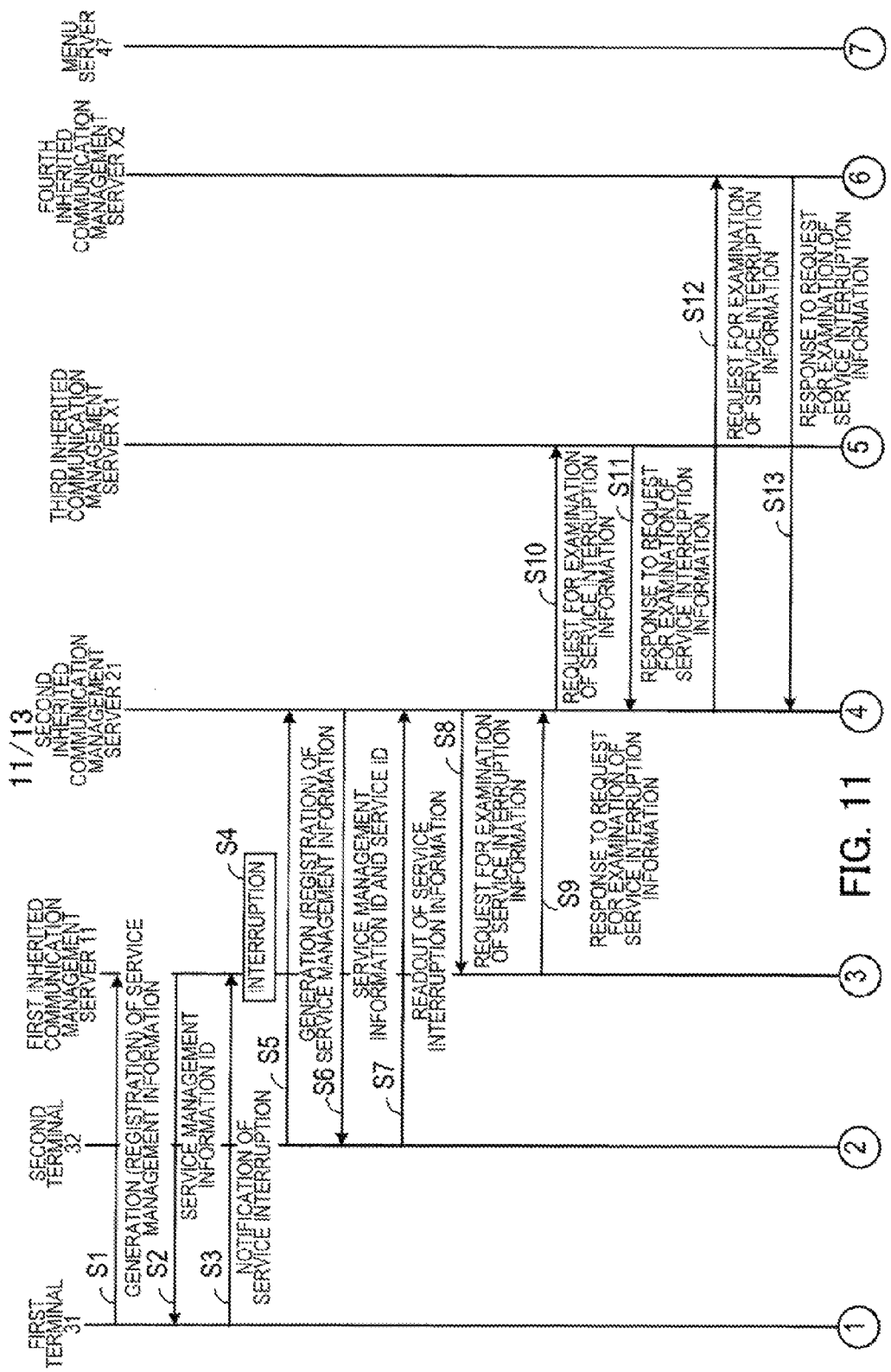
FIG. 11 is a sequence diagram illustrating operations of the inherited communication management servers.
Figure 12:
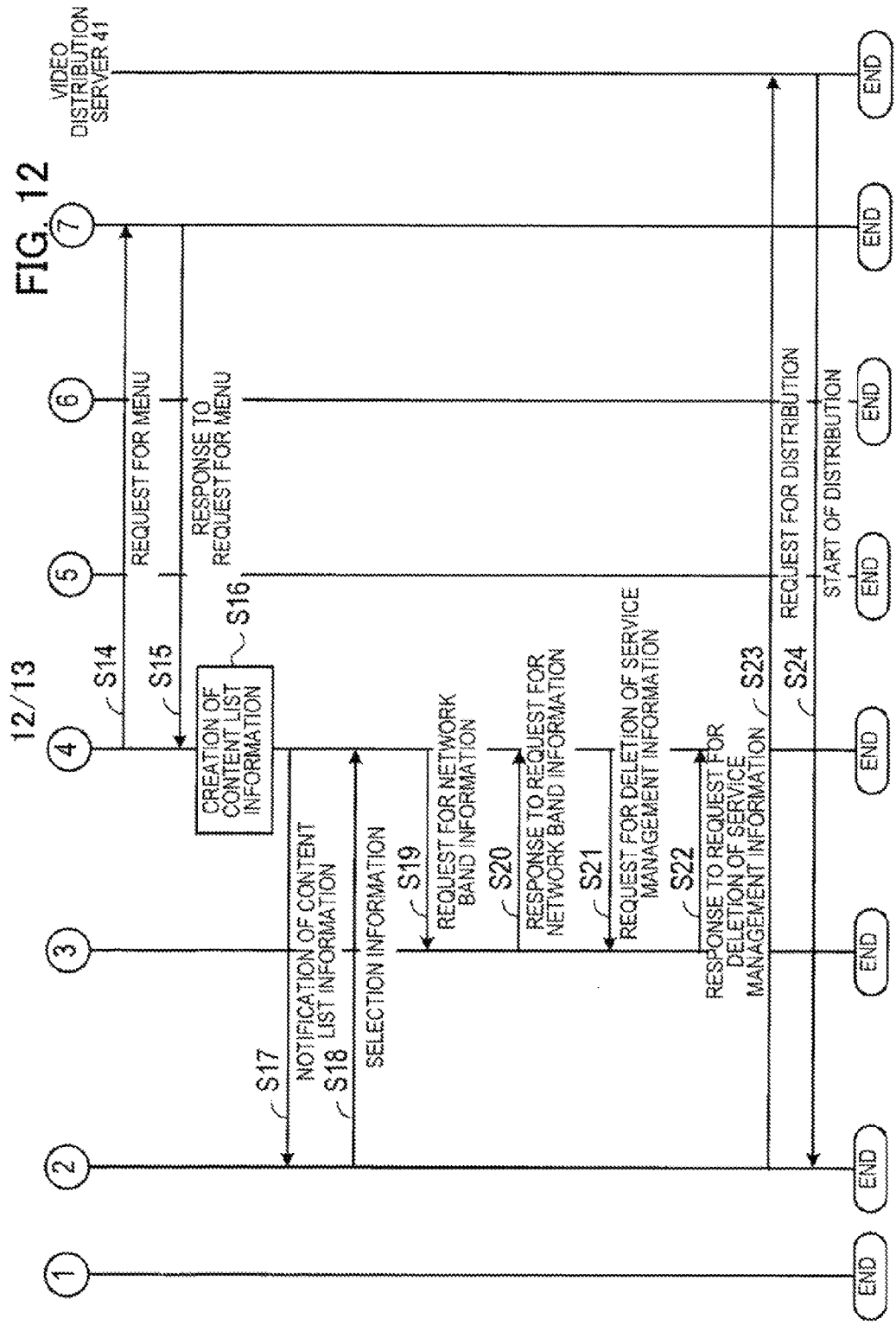
FIG. 12 is a sequence diagram illustrating operations of the inherited communication management servers.

FIGS. 11 and 12 are sequence diagrams illustrating operations of the inherited communication management servers. Although a third inherited communication management server X1 and a fourth inherited communication management server X2 illustrated in FIG. 11 are not illustrated in FIG. 2, the inherited communication management servers X1 and X2 exist in networks managed by other telecommunications carriers.

[Step S1] A user A starts viewing video content (requests video content distribution) using the first terminal 31. When the operation receiving unit 132 of the first terminal 31 receives a distribution request from the user A, the Web browser unit 133 requests the first inherited communication management server 11 of the network 10 to distribute the video content.

When the first inherited communication management server 11 receives the distribution request from the first terminal 31, the Web server unit of the first inherited communication management server 11 requests the menu server 43 to transmit a list of video content available to the user A. The Web server unit transmits the list of video content received from the menu server 43 to the first terminal 31.

The Web browser unit 133 of the first terminal 31 displays the list of video content received from the first inherited communication management server 11 on a display screen, and receives a selection of the video content that the user A attempts to view. The Web browser unit 133 requests the video distribution server 41 to distribute the video content selected by the user A. The player unit 134 reproduces the video content distributed from the video distribution server 41.

When the first inherited communication management server 11 receives the distribution request from the first terminal 31, the management information control unit of the first inherited communication management server 11 generates service management information 126 illustrated in FIG. 5. Herein, the management information control unit generates service management information ID "1" for the user A, and stores "1" in the field of the service management information ID.

In addition, the content type of the video content is, for example, "1111". The management information control unit stores "1111" in the field of the service ID.

In addition, the user ID of the user A is, for example, "aaaa". The management information control unit stores "aaaa" in the field of the user ID. Since the user A reproduces video content, the management information control unit stores "playback" in the field of the state.

The player unit 134 of the first terminal 31 reports the playback state to the first inherited communication management server 11. When the first inherited communication management server 11 receives the report from the first terminal 31, the management information control unit of the first inherited communication management server 11 stores the information relating to the location of the video content that the user A is viewing, the volume and the voice channel on which the user A is viewing the video content, and the subtitle display information in the field of the viewing information. In addition, the management information control unit successively updates the playback time in the field of the viewing information in response to the report from the first terminal 31.

In addition, the management information control unit stores the terminal information received on the distribution request from the first terminal 31 in the field of the terminal information. For example, the management information control unit stores information indicating that the first terminal 31 is a cellular phone in the field of the terminal information. In addition, the management information control unit stores the network band of the video content received by the first terminal 31 in the field of the band information on the basis of the report about the playback state from the first terminal 31.

[Step S2] The management information control unit of the first inherited communication management server 11 transmits the service management information ID "1" generated in Step S1 to the first terminal 31.

[Step S3] The user A stops viewing the video content that the user is viewing using the first terminal 31. When the operation receiving unit 132 of the first terminal 31 receives the interruption of the content viewing by the user A, the Web browser unit 133 notifies the first inherited communication management server 11 of the service interruption. When the Web browser unit 133 notifies of the service interruption, the Web browser unit 133 transmits the service management information ID "1", notified from the first inherited communication management server 11, to the first inherited communication management server 11.

[Step S4] The management information control unit of the first inherited communication management server 11 performs a process of interrupting the content viewing using the first terminal 31. The management information control unit changes the field of the state of the service management information including the service management information ID "1" to "interrupted". In addition, the management information control unit stores the interruption information in the field of the viewing information. For example, the management information control unit stores the interrupted time at which the user stopped playing the content in the field of the viewing information.

[Step S5] After the user A stopped viewing the video content using the first terminal 31, the user A resumes viewing the video content using the second terminal 32. For example, the user A accesses a portal site of the Internet provider of the network 20 using the second terminal 32. The user clicks a resume playback button displayed on the portal site. When the operation receiving unit 142 of the second terminal 32 receives a click operation on the resume playback button from the user A, the Web browser unit 143 requests the second inherited communication management server 21 of the network 20 to distribute the video content (requests resumption of distribution).

When the second inherited communication management server 21 receives the distribution request from the second terminal 32, the management information control unit 122 of the second inherited communication management server 21 generates service management information 126 illustrated in FIG. 5. Herein, the management information control unit 122 generates service management information ID "2" for the user A, and stores "2" in the field of the service management information ID. Since the user A requests the resumption of distribution of the video content, the management information control unit 122 stores "1111" in the field of the service ID of the service management information 126.

[Step S6] The management information control unit 122 of the second inherited communication management server 21 transmits the service management information ID "2" and the service ID "1111" generated in Step S5 to the second terminal 32.

[Step S7] When the second terminal 32 receives the service management information ID "2" and the service ID "1111" from the second inherited communication management server 21, the Web browser unit 143 of the second terminal 32 transmits the user ID "aaaa" of the user A and the service ID "1111" to the second inherited communication management server 21.

[Step S8] The management information control unit 122 of the second inherited communication management server 21 requests the inherited communication management servers managed by the other telecommunications carriers to examine whether or not the inherited communication management servers store service interruption information. That is, the management information control unit 122 requests the inherited communication management servers that belong to the networks of the other telecommunications carriers to examine whether or not the inherited communication management servers store viewing information including information relating to interruption of content viewing by the user A. On the request for the examination, the management information control unit 122 transmits the user ID of the user A and the service ID received in Step S7 to the other inherited communication management servers.

The management information control unit 122 refers to the address information 127 illustrated in FIG. 6, and requests examination in a multicast mode. For example, when the IP addresses of the inherited communication management servers 11, X1, and X2 are stored in the fields of the servers corresponding to the field of the user ID "aaaa" in the address information 127, the management information control unit 122 requests the first inherited communication management server 11 to examine whether or not the first inherited communication management server 11 stores the service interruption information. As described in the following Steps S10 and S12, the management information control unit 122 also requests the inherited communication management servers X1 and X2 to examine whether or not the inherited communication management servers store the service interruption information.

[Step S9] When the first inherited communication management server 11 receives the examination request from the second inherited communication management server 21, the management information control unit of the first inherited communication management server 11 examines whether the first inherited communication management server 11 stores information relating to the service interruption by the user A. The management information control unit refers to the service management information on the basis of the user ID and the service ID received from the second inherited communication management server 21, and examines whether the first inherited communication management server 11 stores information relating to the service interruption by the user A.

The management information control unit generates a result of the examination of information relating to the service interruption by the user A. For example, the management information control unit generates a result of the examination of whether the first inherited communication management server 11 stores information relating to the service interruption by the user A. When the first inherited communication management server 11 stores the information relating to the service interruption by the user A, the management information control unit includes the service management information ID for the user A and information relating to the content viewing by the user A into the examination result.

Since the first inherited communication management server 11 herein stores information relating to the service interruption of the service ID "1111" by the user with the user ID "aaaa" in the process in Step S4, the management information control unit of the first inherited communication management server 11 transmits the examination result indicating that the first inherited communication management server 11 stores information relating to the service interruption by the user A, the service management information ID "1" for the user A, and information relating to the content viewing by the user A to the second inherited communication management server 21.

[Step S10] The management information control unit 122 of the second inherited communication management server 21 requests the third inherited communication management server X1 to examine whether or not the third inherited communication management server X1 stores the service interruption information as in Step S8.

[Step S11] When the third inherited communication management server X1 receives the examination request from the second inherited communication management server 21, the management information control unit of the third inherited communication management server X1 examines whether or not the third inherited communication management server X1 stores information relating to the service interruption by the user A. Since the third inherited communication management server X1 herein does not store information relating to the service interruption by the user A, the third inherited communication management server X1 transmits an examination result indicating that the third inherited communication management server X1 does not store the service interruption information to the second inherited communication management server 21.

[Step S12] The management information control unit 122 of the second inherited communication management server 21 requests the fourth inherited communication management server X2 to examine whether or not the fourth inherited communication management server X2 stores the service interruption information as in Step S8.

[Step S13] When the fourth inherited communication management server X2 receives the examination request from the second inherited communication management server 21, the management information control unit of the fourth inherited communication management server X2 examines whether the fourth inherited communication management server X2 stores information relating to the service interruption by the user A. Since the fourth inherited communication management server X2 herein does not store information relating to the service interruption by the user A, the fourth inherited communication management server X2 transmits an examination result indicating that the fourth inherited communication management server X2 does not store the service interruption information to the second inherited communication management server 21.

[Step S14] The Web server unit 123 of the second inherited communication management server 21 requests a menu of video content available to the user A using the second terminal 32 from the menu server 47.

[Step S15] The Web server unit of the menu server 47 transmits a menu of video content available to the user A to the second inherited communication management server 21.

In the sequence illustrated in FIGS. 11 and 12, when the user A clicks the resume playback button on the portal site, a list of video content available to the user A using the second terminal 32 is displayed on the second terminal 32 in addition to a list of video content that the user A stopped viewing. To this end, the second inherited communication management server 21 acquires the menu of video content available to the user A in Steps S14 and S15. As a matter of course, only the list of video content that the user A stopped viewing may be displayed on the second terminal 32 when the user A clicks the resume playback button on the portal site. In this case, processes in Steps S14 and S15 are not necessary.

[Step S16] The management information control unit 122 of the second inherited communication management server 21 generates information relating to the list of video content available to the user A on the basis of the information relating to the content viewing by the user A received in Step S9 and the menu of video content received in Step S15.

[Step S17] The management information control unit 122 of the second inherited communication management server 21 transmits the content list information generated in Step S16 to the second terminal 32.

The content list information includes, for example, the names and information relating to the locations such as URLs of the video content available to the user A using the second terminal 32. This information is obtained in response to the request for the menu in Step S15.

The content list information also includes the service management information ID and the viewing information relating to the content that the user A stopped viewing. In the case above, the content list information includes the service management information ID "1" and the viewing information received in Step S9.

The Web browser unit 143 of the second terminal 32 displays lists of content available to the user A on a screen on the basis of the received content list information. For example, the Web browser unit 143 displays the list of video content that the user A stopped viewing and the list of video content available to the user A using the second terminal 32.

Figure 13:
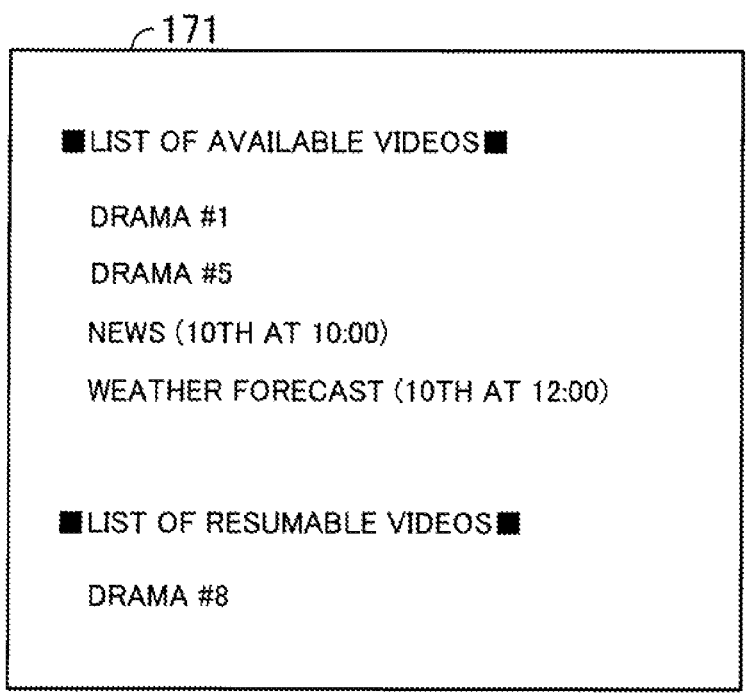
FIG. 13 illustrates an example display screen of the second terminal.

FIG. 13 illustrates an example display screen of the second terminal. FIG. 13 illustrates a display screen 171 of the second terminal 32. As illustrated in FIG. 13, a "list of available videos" available to the user A and a "list of resumable videos" that the user A stopped viewing and that may be resumed are displayed on the display screen 171 of the second terminal 32. Content information indicating, for example, "drama #1" in the "list of available videos" on the display screen 171 is obtained in, for example, Steps S14 and S15, and content information indicating "drama #8" in the "list of resumable videos" is obtained in, for example, Steps S8 to S13. Although only one item is included in the list of resumable videos on the display screen 171, a plurality of items may be displayed if the user A stopped viewing a plurality of video content items.

Further description will be given with reference to FIG. 12 again.

[Step S18] The user A selects a video content item that he/she attempts to view from the list of video content displayed on the second terminal 32. The Web browser unit 143 of the second terminal 32 requests the video distribution server 45 to distribute the video content item selected by the user A. Alternatively, the Web browser unit 143 of the second terminal 32 transmits information relating to the video content selected by the user A to the second inherited communication management server 21.

When the user A selects the drama #1 on the display screen 171, for example, the Web browser unit 143 of the second terminal 32 requests the video distribution server 45 to distribute the video content of the drama #1 on the basis of the URL corresponding to the drama #1.

Alternatively, when the user A selects the drama #8 on the display screen 171, for example, the Web browser unit 143 of the second terminal 32 transmits the service management information ID before network switching from the network in which the drama #8 was viewed, the service management information ID after the network switching, and information relating to viewing of the drama #8 to the second inherited communication management server 21. For example, the Web browser unit 143 transmits the service management information ID "1" before the network switching received in Step S17, the service management information ID "2" after the network switching received in Step S6, and the viewing information received in Step S17 to the second inherited communication management server 21.

Herein, the user A selects the video content that the user A stopped viewing from the list of video content displayed on the second terminal 32.

[Step S19] The management information control unit 122 of the second inherited communication management server 21 requests the network band information from the first inherited communication management server 11 that interrupted the content. At this moment, the management information control unit 122 transmits the service management information ID before interruption received in Step S18 to the first inherited communication management server 11.

[Step S20] The management information control unit of the first inherited communication management server 11 acquires the band information for the user A on the basis of the service management information ID received in Step S19. The management information control unit transmits the acquired band information to the second inherited communication management server 21.

The management information control unit 122 of the second inherited communication management server 21 determines whether or not the interrupted video content is reproducible by the second terminal 32 in the network band included in the received band information. When the management information control unit 122 determines that the video content is not reproducible by the second terminal 32, the management information control unit 122 transmits a message to that effect to the second terminal 32. Alternatively, the management information control unit 122 notifies the second terminal 32 of an URL of a video distribution server capable of distributing content that is the same as the content the user stopped viewing and that is reproducible by the second terminal 32.

The video content may not be reproducible when, for example, the user switches from viewing using an Internet television to viewing using a cellular phone. When the network band of the mobile terminal is narrower than that of the Internet television, for example, the video content may not be reproducible by the mobile terminal. Herein, the video content that the user stopped viewing is reproducible by the second terminal 32.

[Step S21] The management information control unit 122 of the second inherited communication management server 21 requests the first inherited communication management server 11 to delete the service management information for the user A. At this moment, the management information control unit 122 transmits the service management information ID received in Step S18. For example, the management information control unit 122 transmits the service management information ID "1" to the first inherited communication management server 11.

The management information control unit of the first inherited communication management server 11 deletes the service management information including the service management information ID received from the second inherited communication management server 21. For example, the management information control unit deletes the service management information including the service management information ID "1" generated in Step S1.

[Step S22] The management information control unit 122 of the second inherited communication management server 21 receives a response to the request to delete the service management information from the first inherited communication management server 11. When the management information control unit 122 receives the response to the request to delete the service management information, the management information control unit 122 stores the viewing information received in Step S18 in the service management information generated in Step S5. That is, the management information control unit 122 changes the viewing information included in the service management information generated on the request from the user A for the resumption of viewing to that before the interruption. In this manner, the second inherited communication management server 21 takes over the service management information for the user A managed by the first inherited communication management server 11.

[Step S23] The Web browser unit 143 of the second terminal 32 requests the video distribution server 41 to distribute the video content selected in Step S18. For example, the Web browser unit 143 of the second terminal 32 requests the video distribution server 41 to distribute the video content from the position at which the user A stopped viewing on the basis of the viewing information received in Step S17.

Herein, the Web browser unit 143 may request the video distribution server 41 to distribute the video content from a position preceding the interrupted position at which the user A stopped viewing by a predetermined time period. For example, the Web browser unit 143 may request the video distribution server 41 to distribute the video content from a position five seconds before the interrupted position at which the user A stopped viewing.

[Step S24] The video distribution unit 152 of the video distribution server 41 distributes the video content requested by the second terminal 32 to the second terminal 32. The player unit 144 of the second terminal 32 reproduces the video content distributed from the video distribution server 41.

In this manner, when the second inherited communication management server 21 receives a request for video content viewing from the user A of the second terminal 32, the management information control unit 122 of the second inherited communication management server 21 requests the inherited communication management servers 11, X1, and X2 that belong to the networks of the other telecommunications carriers to examine whether or not the inherited communication management servers store viewing information including information relating to interruption of the content viewing by the user A. When the examination results received by the management information control unit 122 include viewing information including information relating to the interruption of the content viewing, the information relating to the content that the user stopped viewing is transmitted to the second terminal that made a request for the content viewing. This allows the user A to resume viewing the interrupted content using the second terminal 32 connected to the network 20 of the second telecommunications carrier even when the user A stopped viewing the content using another terminal connected to a network of a telecommunications carrier different from the second telecommunications carrier.

In addition, the management information control unit 122 of the second inherited communication management server 21 requests the first inherited communication management server 11 to delete the service management information. The second inherited communication management server 21 takes over the interruption information for the user A stored in the first inherited communication management server 11. This allows the user A to stop viewing the video content through the second inherited communication management server 21 and to resume viewing the video content through another inherited communication management server that belongs to a network of a telecommunications carrier different from the second telecommunications carrier.

According to the disclosed apparatuses and the method, a user may resume viewing content using a terminal connected to a network of a telecommunications carrier even when the user stopped viewing the content using another terminal connected to a network that belongs to another telecommunications carrier.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An inherited communication management apparatus, managed in a first network of a first telecommunications carrier, connected to a content distribution system including a distribution server that distributes content and terminals that receive and reproduce the content, the apparatus comprising:
    a storage unit that stores viewing information relating to a content viewing state of a terminal;
    a requesting unit that requests another inherited communication management apparatus, managed in a second network of a second telecommunications carrier different from the first telecommunications carrier, to examine whether or not the other inherited communication management apparatus stores viewing information including information relating to interruption of content viewing on a request from the terminal for the content viewing;
    a receiving unit that receives a result of the requested examination;
    a transmitting unit that transmits information relating to interrupted content based on the viewing information to the terminal that has requested the content viewing when the received examination result includes the viewing information including information relating to the interruption of the content viewing; and
    a controller that acquires band information for the terminal;
    wherein the transmitting unit causes the terminal to resume viewing the interrupted content, serviced by the second network of the second telecommunications carrier, through the first network of the first telecommunications carrier,
    wherein the controller determines based on the band information whether or not the interrupted content is reproducible by the terminal, and notifies the terminal of a URL of a content distribution server capable of distributing content that is the same as the content stopped viewing and that is reproducible by the terminal when the interrupted content is not reproducible by the terminal.

2. The inherited communication management apparatus according to claim 1, further comprising:
    a deletion requesting unit that requests the other inherited communication management apparatus that has transmitted the examination result to delete service management information, managed for each terminal user and including the viewing information, when the examination result includes the viewing information including information relating to the interruption of the content viewing.

3. The inherited communication management apparatus according to claim 1, wherein the requesting unit transmits a user identifier of a user and a service identifier indicating a content type of content to be viewed by the user to the other inherited communication management apparatus when the requesting unit requests the examination from the other inherited communication management apparatus.

4. The inherited communication management apparatus according to claim 1, wherein
    the viewing information includes interrupted position information indicating an interrupted position of the content viewed using the terminal, and the transmitting unit transmits the interrupted position information to the terminal that has requested the content viewing.

5. The inherited communication management apparatus according to claim 1, further comprising:
an address information storage unit that stores, for each user, address information relating to the other inherited communication management apparatus that the user is allowed to access.

6. The inherited communication management apparatus according to claim 5, wherein the requesting unit requests the examination from the other inherited communication management apparatus by referring to the address information storage unit.

7. A method of managing inherited communication for an inherited communication management apparatus, managed in a first network of a first telecommunications carrier, connected to a content distribution system including a distribution server that distributes content and terminals that receive and reproduce the content, the method comprising:
requesting another inherited communication management apparatus, managed in a second network of a second telecommunications carrier different from the first telecommunications carrier, to examine whether or not the other inherited communication management apparatus stores viewing information including information relating to interruption of content viewing on a request from a terminal for the content viewing;
receiving a result of the requested examination;
transmitting information relating to interrupted content based on the viewing information to the terminal that has requested the content viewing when the received examination result includes the viewing information including information relating to the interruption of the content viewing;
causing the terminal to resume viewing the interrupted content, serviced by the second network of the second telecommunications carrier, through the first network of the first telecommunications carrier;
acquiring band information for the terminal; and
determining based on the band information whether or not the interrupted content is reproducible by the terminal, and notifying the terminal of a URL of a content distribution server capable of distributing content that is the same as the content stopped viewing and that is reproducible by the terminal when the interrupted content is not reproducible by the terminal.

* * * * *